United States Patent Office 3,734,990
Patented May 22, 1973

---

3,734,990
PROCESS FOR THE MANUFACTURE OF CORRUGATED GLASS FIBER REINFORCED POLYVINYL CHLORIDE SHEETS
William K. Glesner, Midland, Mich., and Clifford E. Thompson, Horgen, Switzerland, assignors to The Dow Chemical Company, Midland, Mich.
No Drawing. Continuation-in-part of abandoned application Ser. No. 590,502, Oct. 3, 1966. This application Apr. 15, 1970, Ser. No. 28,921
Int. Cl. B29g 5/00
U.S. Cl. 264—137                             2 Claims

ABSTRACT OF THE DISCLOSURE

The present invention is directed to an improved process for the manufacture of corrugated sheet materials from glass fiber reinforced mats impregnated with certain polymerizable fluid compositions where the impregnated mat is shaped prior to initiation of gelling of the polymerizable fluid composition thereby providing unexpectedly enhanced uniformity and transparency in the finally cured corrugated structures.

---

This application is a continuation-in-part of copending application, Ser. No. 590,502 filed Oct. 3, 1966, now abandoned.

BACKGROUND OF THE INVENTION

Prior known corrugated sheet materials prepared from glass fiber reinforced sheets of polyvinyl chloride paste resins have suffered from undesirable non-uniformity and opaqueness due to the presence of air bubbles and polymer gels.

It is the primary object of the present invention to provide a means for the preparation of corrugated sheet structures from glass fiber reinforced polyvinyl chloride paste resins which sheet materials are essentially uniform and transparent.

SUMMARY OF THE INVENTION

The above and related objects and advantages are obtained by a process consisting of the sequential steps of:

(I) Depositing a layer of a polymerizable polyvinyl chloride paste composition consisting essentially of (1) from about 55 to 65 parts by weight of a paste-grade vinyl chloride polymer containing at least about 95 weight percent of polyvinyl chloride in the polymer molecule, (2) from about 15 to 20 parts by weight of a dialkyl fumarate containing from 2 to 8 carbon atoms in each of the alkyl groups, and (3) from about 20 to 25 parts by weight of vinyl toluene;

(II) Shaping the impregnated mat into a corrugated structure of desired thickness prior to the initiation of gelling or curing of the polymerizable fluid composition;

(III) Heating the corrugated structure to initiate gelling of the polymerizable fluid composition, and (IV) Curing the gelled structure to a rigid state.

DESCRIPTION OF THE PREFERRED EMBODIMENTS

As the vinyl chloride polymer, a wholly paste-grade polyvinyl chloride, is preferred which, when admixed with the remaining constituents of the paste composition described herein, forms a composition which can be gelled to give a coherent form.

The dialkyl fumarate constituent of the paste used in the present invention contains from 2 to 8 carbon atoms in each of the alkyl groups. Exemplary of such materials are diethyl fumarate, dibutyl fumarate, and dioctyl fumarate, with diethyl fumarate being preferred.

The composition of the impregnating paste used in this invention is critical for obtaining satisfactory results, i.e. such paste should be free-flowing, must wet the glass fibers, and the viscosity should be such as to facilitate the release of air bubbles from the impregnated material before the paste is converted to a gel state. Such paste should also be substantially nonvolatile during gelling and should have a reasonable pot-life under normal conditions of use.

The preferred pastes for use in this invention thus comprise a paste-grade polyvinyl chloride, diethyl fumarate and vinyltoluene. Such compositions have the desired attributes of the paste described above, impregnate glass fabric readily, and can be gelled rapidly in the fabric to give sheets which can be cured to yield rigid, highly uniform, reinforced polyvinyl chloride sheet material which is desirably transparent. A particularly suitable paste for use in the present process comprises about 60 parts by weight of paste-grade polyvinyl chloride, about 18 parts by weight of diethyl fumarate and about 22 parts by weight of a vinyltoluene. It is to be understood that the proportions of such constituents may be varied somewhat in relation to each other without materially affecting the desired properties of the paste. Further, the proportions of the ingredients of the pastes used in this invention will depend not only upon the particular substances used but also upon the properties desired in the paste and the cured product. These proportions can be determined experimentally for any particular composition. In general, increasing the amount of diethyl fumarate increases the pot-life and ease of impregnation and also increases the flexibility of the cured product. At the same time, however, it often undesirably reduces the softening point and rate of cure of sheets prepared from such compositions.

The proportion of glass fibers present in the cured product will generally be of the order of about 20 percent by weight where optimum transparency is desired. It is possible, however, to incorporate up to about 30 percent by weight of glass while still retaining translucency or semi-transparency in the cured product. The glass fibers may be used in the form of the free fibers or in the form of a mat in which the fibers are bonded by pretreatment with a resin. A fabric woven from glass fibers may also be used.

The curing of the sheet material of this invention is conveniently effected by incorporation of a free radical polymerization initiator in the impregnating paste. Exemplary of a particularly preferred polymerization initiator is benzoyl peroxide. Other polymerization initiators which may be used are those which decompose to yield free radicals at relatively high temperatures, i.e. which are catalyticaly effective at a temperature of 100° C. or more. Exemplary of such materials are dicumyl peroxide and tertiary butyl perbenzoate, among others.

Curing may, however, be effected by other means, for example, by means of ionizing radiation. As such radiation there may be mentioned beta rays, accelerated electrons, thermal neutrons, accelerated deutrons and protons, X-rays, or gamma rays. Generally, only relatively low doses of radiation, i.e. within the range of 1 to 15 megarads, are required for curing the compositions used in the present invention. Curing may also be effected by other means as by means of ultra-violet radiation in conjunction with a sensitizer such as the benzophenones, hexachlorobenzene and the like.

The present invention is more especially concerned with a continuous process for the production of highly uniform transparent reinforced polyvinyl chloride sheet material. Such process is carried out by first depositing a layer of the polymerizable fluid composition on a layer of glass fiber reinforcement (preferably in the form of glass mat or roving) which reinforcement is supported on a parting film such as cellophane, glassine paper, polyethylene terephthalate and the like, and wherein such parting film is deposited on an endless moving belt. The impregnated mat is then passed through sizing rolls to obtain the proper thickness. The impregnated mat is then cold-formed, i.e. formed into desired shape (such as corrugated sheet) by passage of the mat over forming plates maintained at a temperature below that sufficient to initiate gelling and/or curing of the polymerizable fluid composition. The cold-formed material is then passed over identical forming plates which are maintained at a temperature sufficient to convert the paste into a gel state and render it a hard, self-supporting transparent sheet material. The gelling stage requires careful control as, with the pastes used in the present process, excessive heating will tend to drive off the more volatile unsaturated hydrocarbons, with the result that not only will the nature of the polyvinyl chloride gel be changed to an undesirable extent, but surface fissures and bubbles may be caused. Further, it is necessary that the impregnated mat is cold-formed prior to gelling. In this regard, it has been unexpectedly found that such technique significantly improved the uniformity of the finally produced reinforced sheet material.

After a gel state, the sheet is cured by conveying it on a continuous belt (where a polymerization initiator is present in the polyvinyl chloride plastisol) into a heated curing oven where the vinyl monomer constituents of such paste are caused to polymerize and graft onto the polyvinyl chloride. When using this technique it is important that the initiator shall not liberate free radicals at a temperature substantially below that required to cause gelation, as this would lead to non-homogeneous or opaque material.

Optionally, where free radical initiators are not used, the gelled sheet may be cured by conveying it under a beam of high energy electrons and the like until polymerization of the paste ingredients is complete.

An important feature of the present invention resides in the production of highly uniform sheet material which may be either transparent or translucent, or which may be colored as desired. The glass fibers embedded in the polyvinyl chloride can be rendered invisible by matching their refractive index with that of the cured polyvinyl chloride resin. Furthermore, maximum transparency necessitates thorough impregnation and displacement of air and/or binder from the interstices of the glass reinforcement, which is achieved by deposition of the polyvinyl chloride paste onto the glass fiber reinforcement. Thus, the paste compositions of the present invention are especially suitable for the production of transparent or translucent sheets. The paste may also contain other constituents, for example heat stabilizers, ultra-violet stabilizers, and pigments.

The sheet material of the invention has good resistance to corrosive agencies as, for example, acids or alkalies, a characteristic which is general in polyvinyl chloride materials. It also exhibits good resistance to discoloration by ultra-violet light, and to the action of many solvents.

The rigidity of the sheet material, both at room temperature and more particularly at elevated temperatures, as for example 100° C., is greater than that of normal rigid polyvinyl chloride materials; the tendency to gradual distortion of "creep" under continual loading is also less than with rigid polyvinyl chloride. Thus the material of the invention can often be used to replace rigid polyvinyl chloride sheet and in a smaller thickness, leading to economy, and it can also be used in applications for which rigid polyvinyl chloride would be altogether unsuitable because of its low rigidity at elevated temperatures.

A further advantage is that the material has a low rate of burning and, when the material is caused to burn by applying a flame, there is no tendency for portions of softened burning material to become detached from the sheet.

It has further been discovered, which discovery forms a part of the present invention, that reinforced laminate structures having the combination of highly desirable properties as previously set forth herein and which, in addition, are highly resistant to the deleterious effects of extended exposure to atmospheric conditions, are obtained by applying a protective film material to the exposed surface of the impregnated glass mat prior to cold-forming and subsequent gelation and curing thereof.

More particularly, it has been found to be of especial advantage to apply a polyvinyl fluoride film to the exposed surface of the polyvinyl chloride paste impregnated glass mat. Such film is caused to adhere to the mat by applying to a surface of the film, prior to its application to the mat, of a continuous adherent intermediate adhesion promoting layer of a polymerizable polyester. The coated film is then partially gelled by the application of heat and the coated surface of the film applied to the as yet non-gelled exposed surface of the impregnated glass mat. In utilizing this embodiment of the present invention it has been found to be particularly advantageous to use, as the intermediate adhesion promoting layer, a polymerizable polyester resin containing small but effective amounts of an ultra-violet light absorbing material such as the benzotriazoles, particularly the ortho hydroxy alkyl substituted benzotriazoles and, in addition, small but effective amounts of a free-radical generating polymerization initiator which is capable of gelling and subsequently polymerizing the polyester resin. A particularly useful polymerization initiator is benzoyl peroxide although other conventional initiators, as previously described herein, may be used. Similarly, other known ultra-violet light absorbing agents may be employed if desired including the substituted benzophenones, salicylates, and the like among many others.

The following examples illustrate the invention, the parts, and percentages being by weight.

Example I

A charge of 60 parts by weight of finely divided polyvinyl chloride of plastisol grade (Bakelite QYNV) was blended with 18 parts by weight of diethyl fumarate and 22 parts by weight of a vinyltoluene at a temperature of about 20° C. The fluid dispersion had an absolute viscosity of about 300 centipoises at 20° C. as determined by a Brookfield viscosimeter. The vinyltoluene employed was a mixture of approximately 65 percent by weight of meta vinyltoluene and 35 percent by weight para vinyltoluene. There was added to the dispersion of the polyvinyl chloride in the monomers 0.4 part by weight of benzoyl peroxide, 0.2 part by weight of dicumyl peroxide, 0.1 part by weight of the stabilizer 2-hydroxy, 5-methyl benzotriazole and 0.2 part by weight of the stabilizer dibutyl tin 5,5'(3,5,5-trimethylhexyl mercapto acetate). The mixture was then stirred under vacuum to remove dissolved air.

The resulting paste was then fed at a rate of 105 grams per minute onto a 9-inch wide mat comprising a glass roving chopped in a 2-inch length and distributed randomly onto a continuous sheet of cellophane which sheet was in turn carried by an endless stainless steel conveyor travelling at a speed of approximately 1 foot per minute.

The impregnated glass mat was then passed through sizing rolls to obtain a thickness of about .065 of an inch, followed by passage through corrugating plates, maintained at a temperature of about 20° C. which was insufficient to cause gelling of the polyvinyl chloride paste. Such rolls imposed longitudinal corrugations in the sheet by means of a folding action. The corrugated laminate structure was then immediately passed through a second series of identical corrugating plates, which were maintained at a temperature of about 100° C. which temperature was sufficient to cause the polyvinyl chloride paste constituent of the sheet to gel. The gelled sheet was then carried by an endless belt conveyor into a two-stage curing oven maintained at a temperature of about 125° C. and 160° C., wherein the vinyl monomer constituents of the polyvinyl chloride paste were polymerized and grafted to the polyvinyl chloride, to produce a rigid, tough, transparent, highly uniform panel. The sheet was then cooled and cut to required lengths.

By way of comparison, it was found that preparation of a sheet material of identical composition by the process described herein, but wherein the glass fiber reinforcement was deposited on the polyvinyl chloride paste which was in turn deposited on the cellophane parting sheet, was characterized by the presence of excessive amounts of air bubbles which are at best difficultly removed, as for example, by passing the impregnated material through a series of beaters prior to shaping.

In yet another comparison, it was found that preparation of a sheet material of identical composition prepared by the herein specifically described process, but wherein the impregnated glass mat was not shaped prior to gelling, i.e. where the non-gelled impregnated glass mat was passed immediately into gel producing heated corrugating rolls, produced a cured panel of reduced uniformity, i.e. when the forming is done while gelling, heat is transferred back into the non-formed portion causing intermittent gelling which in the final panel appears as humps and pockets.

Example II

A corrugated structure was prepared as described by the preferred process of Example I, but wherein the exposed surface of the non-gelled impregnated glass mat (prior to shaping thereof) was laminated to a sheet of a polyvinyl fluoride film (Tedlar) coated with an intermediate adhesion promoting polyester layer. In this process a continuous coating having a thickness of about .002–.004 of an inch and composed of 50 parts by weight of polymerizable polyester resin, 50 parts by weight of vinyltoluene (65 parts of meta vinyltoluene and 35 parts of para vinyltoluene), 1 part by weight of benzoyl peroxide and 4 parts by weight of the ultra-violet stabilizer 2-hydroxy, 5-methyl benzotriazole, was then applied to a surface of the polyvinyl fluoride film having a thickness of about 0.001 of an inch. The coated film was then heated to a temperature of about 100° C. for 1 minute which was sufficient to partially gel the polyester coating. The coated side of such film was then applied, in a continuous manner, to the exposed surface of the non-gelled impregnated glass mat, after which the laminate was shaped, gelled, and cured, utilizing the steps as specifically set forth in the preferred teachings of Example I. The corrugated laminate sheet material so produced was a rigid, tough, transparent, highly uniform panel which was characterized by having excellent resistance to the deleterious effects of extended exposure to widely varying atmospheric conditions.

What is claimed is:

1. In the process for the manufacture of corrugated glass fiber reinforced polyvinyl chloride sheet material comprising depositing a polymerizable fluid composition prepared from a mixture of (1) from about 55 to 65 parts by weight of a paste-grade vinyl chloride polymer, (2) from about 15 to 20 parts by weight of a dialkyl fumarate containing from 2 to 8 carbon atoms in each alkyl group and (3) from about 20 to 25 parts by weight of vinyl toluene, on a layer of glass fiber reinforcement to form an impregnated mat; shaping said impregnated mat into a corrugated sheet structure of desired thickness and curing said polymerizable fluid composition to a rigid state; the improvement consisting of shaping said impregnated mat into said corrugated sheet structure prior to initiating gelling of said polymerizable fluid composition while maintaining said fluid composition at a temperature of about 20° C. or below.

2. The process of claim 1 wherein said polymerizable fluid composition comprises about 60 parts by weight of paste-grade polyvinyl chloride, about 18 parts by weight of diethyl fumarate and about 22 parts by weight of vinyl toluene.

References Cited

UNITED STATES PATENTS

| | | | |
|---|---|---|---|
| 3,012,001 | 12/1961 | Smith | 260—884 |
| 3,036,977 | 5/1962 | Koch et al. | 260—29.6 |
| 3,061,531 | 10/1962 | Smith | 260—884 X |
| 3,133,825 | 5/1964 | Rubens | 117—62 |
| 3,196,030 | 7/1965 | Petry | 117—10 |
| 3,257,266 | 6/1966 | Sapper | 156—333 X |
| 3,265,556 | 8/1966 | Hungerford et al. | 161—133 X |
| 3,274,136 | 9/1966 | Glesner et al. | 156—333 X |

FOREIGN PATENTS

| | | | |
|---|---|---|---|
| 817,684 | 8/1959 | Great Britain | 260—884 |
| 984,731 | 3/1965 | Great Britain | 260—884 |

OTHER REFERENCES

Whittington, L. R.: Whittington's Dictionary of Plastics, Technomic, Stamford, Conn. (1968), p. 173.

ROBERT F. BURNETT, Primary Examiner

J. C. GIL, Assistant Examiner

U.S. Cl. X.R.

161—93, 133, 204, digest 4; 264—206